United States Patent
Vollmers et al.

(10) Patent No.: US 8,405,256 B2
(45) Date of Patent: Mar. 26, 2013

(54) WIRELESS RESONANT MAGNETIC ACUTATION FOR UNTETHERED MICROROBOTS

(75) Inventors: Karl Vollmers, Minneapolis, MN (US); Bradley Nelson, Zumikon (CH); Bradley Kratochvil, Zurich (CH); Dominic Frutiger, Zurich (CH)

(73) Assignee: Eth Zurich, Zurich (CH)

( * ) Notice: Subject to any disclaimer, the term of this patent is extended or adjusted under 35 U.S.C. 154(b) by 462 days.

(21) Appl. No.: 12/667,162

(22) PCT Filed: Jun. 30, 2008

(86) PCT No.: PCT/CH2008/000295
§ 371 (c)(1),
(2), (4) Date: Jun. 21, 2010

(87) PCT Pub. No.: WO2009/003303
PCT Pub. Date: Jan. 8, 2009

(65) Prior Publication Data
US 2010/0264776 A1    Oct. 21, 2010

Related U.S. Application Data

(60) Provisional application No. 60/958,275, filed on Jul. 2, 2007.

(51) Int. Cl.
*H02K 33/00* (2006.01)
(52) U.S. Cl. .......................... 310/15; 310/20
(58) Field of Classification Search .............. 310/15, 310/17, 20, 27, 28, 36, 37, 38
See application file for complete search history.

(56) References Cited

U.S. PATENT DOCUMENTS

| | | | |
|---|---|---|---|
| 5,736,797 A * | 4/1998 | Motohashi et al. | 310/36 |
| 6,774,588 B2 * | 8/2004 | Ibuki et al. | 318/119 |
| 6,958,553 B2 * | 10/2005 | Ichii et al. | 310/15 |
| 7,474,065 B2 * | 1/2009 | Kraus | 318/119 |
| 7,504,751 B2 * | 3/2009 | Kraus et al. | 310/12.04 |
| 2004/0169480 A1 | 9/2004 | Ueda et al. | |
| 2005/0253055 A1 | 11/2005 | Sprague | |
| 2006/0145547 A1 * | 7/2006 | Kraus | 310/36 |

FOREIGN PATENT DOCUMENTS

| | | |
|---|---|---|
| EP | 0763881 A | 3/1997 |
| WO | WO 01/18944 | 3/2001 |

OTHER PUBLICATIONS

"Wireless Drive and Control of a Swimming Microrobot" proceedings of the 2002 IEEE International Conference on Robotics and Automation, ICRA (2002). Washington, DC, May 11-15, 2002 [Proceedings of the IEEE International Conference on Robotics and Automation], New York, NY: IEEE, US, May 11, 2002 pp. 1131-1136; ISBN: 978-0-7803-7272-6 [retrieved on May 11, 2002].
International Search Report for PCT/CH2008/000295.

* cited by examiner

*Primary Examiner* — Dang Le
(74) *Attorney, Agent, or Firm* — Stoel Rives LLP

(57) ABSTRACT

A wireless resonant micro-actuator for untethered microrobots. The wireless resonant micro-actuator includes at least two magnetic bodies that are resiliently connected to one another by a resilient member to form a spring-mass system. A magnetic field generator generates a pulsating or oscillating external magnetic field that creates a magnetic force between the at least two magnetic bodies. The at least two magnetic bodies are capable of being mechanically oscillated to resonance with respect to one another. A converter converts the oscillatory motion of the at least two magnetic bodies to create useful motion.

20 Claims, 6 Drawing Sheets

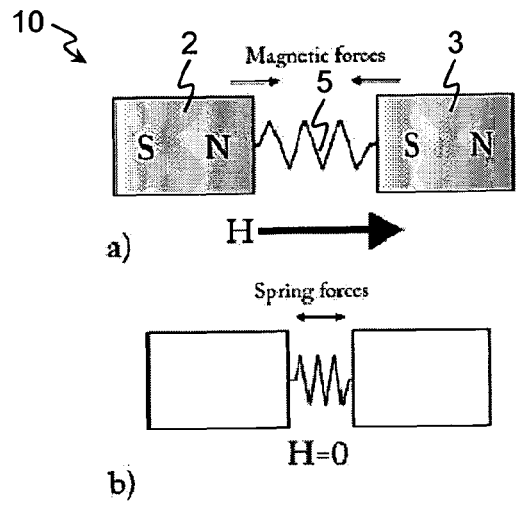
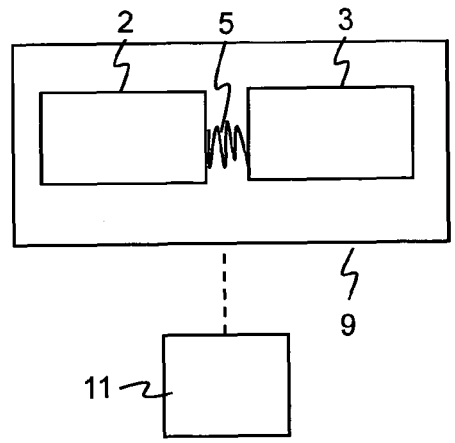
Fig. 1      Fig. 2
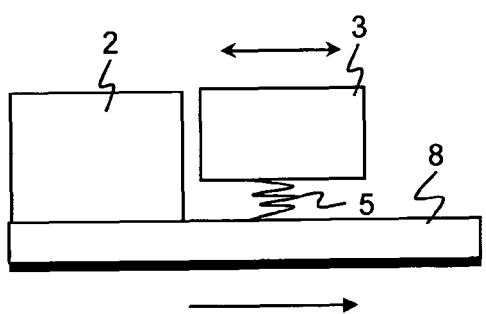
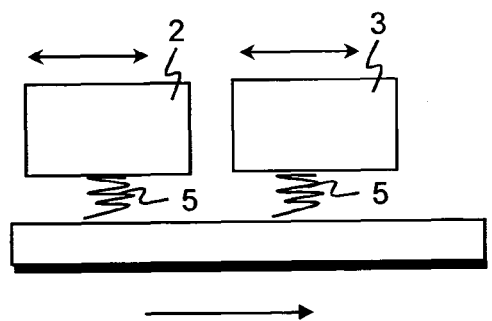
Fig. 3a      Fig. 3b
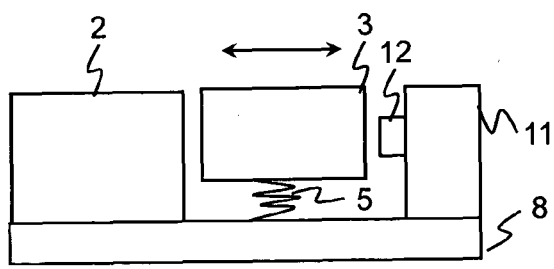
Fig. 3c

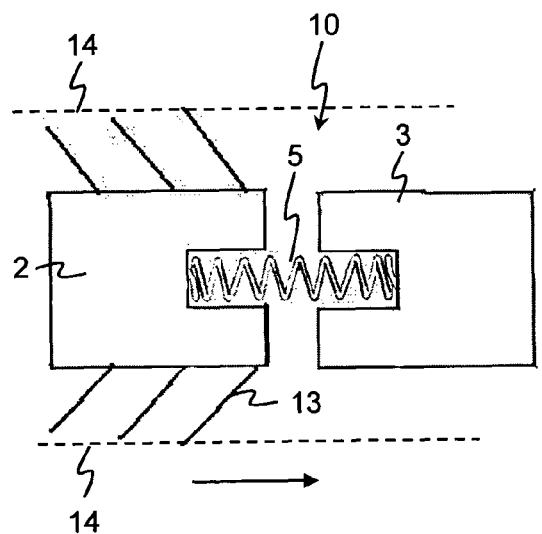
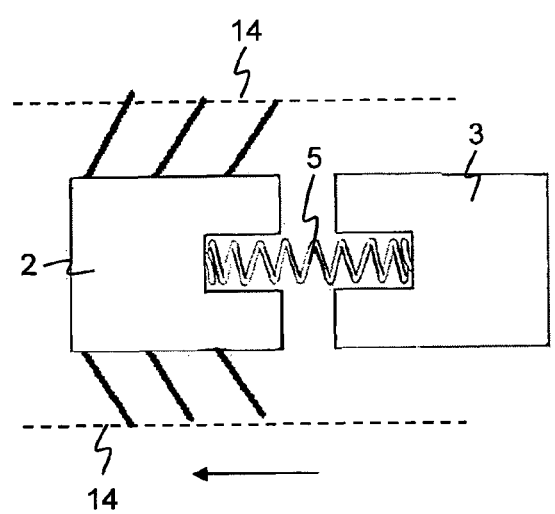
Fig. 14a  Fig. 14b
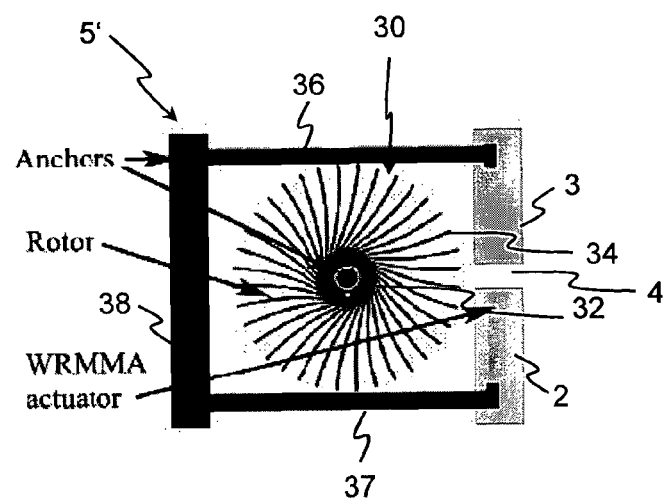
Fig. 15

WIRELESS RESONANT MAGNETIC ACUTATION FOR UNTETHERED MICROROBOTS

FIELD OF THE INVENTION

The invention relates to untethered microrobots and to an actuation method and system therefore. Wireless resonant magnetic microrobots are used to demonstrate a new class of microactuators. These actuators rely on the interactive forces between small magnetic bodies in a pulsating or an oscillating magnetic field.

BACKGROUND OF THE INVENTION

One of the main challenges of building untethered microrobots is in the design of the propulsion system. Due to difficulties in storing energy at these scales, mechanisms are needed for harvesting energy from the environment for wireless applications.

While various methods of wireless sensing have been developed, few methods for wireless actuation have been documented. The lack of suitable miniaturized power sources is a major obstacle to their development. Wireless sensors are unique in that they need only to passively interact with their environment, a requirement that usually demands little or no energy. By definition, successful actuators must do work and expend energy. As forces and working distances increase, energy requirements also increase. Wireless actuators must receive their energy from their environment or from an outside source before they can expend it by acting on their environments. In addition to supplying power, methods for controlling the actuators must also be implemented to make the actuator useful. Depending on the application, actuators must be activated independent of neighboring actuators. A variety of drive methods, including piezoelectric, electrostatic, thermal and vibrational have been demonstrated in both wireless and wired systems. While many groups are working on microactuators few have reported work on actuators for robots.

Current wireless communication or power transmission methods typically involve inductive coupling between antennas. The efficiency of these methods decreases as the area of the coils involved shrinks, making inductive coupling a less attractive method for transmitting power to sub-millimeter microrobots. In addition to this power loss during transmission, such systems require onboard circuitry and electronics to drive the actuators. This leads to further inefficiencies and design challenges. One method of bypassing these problems is to transmit the energy directly to a mechanical structure, and use the structure to power the actuator or the structure is the actuator. This method has been documented in several papers where microrobots are operated in vibration fields or with actuators powered by externally applied vibrations. Other authors have reported on the remote control and propulsion of micro robots with magnetic fields. Most known methods rely on forces acting on permanently magnetized bodies in a gradient magnetic field. It is also known to move a magnetic screw through a medium by means of a rotating magnetic field.

Mei et al., proceedings of the 2002 IEEE International Conference on Robotics and Automation, Washington D.C., May 2002, p. 1131-1136, discloses a, much larger, swimming "microrobot" comprising a main body of 20 mm length with two resilient magnetic fins protruding from the body in different directions. Both fins bend in an external magnetic field to align therewith, and resume their original shape when the magnetic field is switched off. In an oscillating magnetic field, an oscillatory motion of the fins is generated, such that the device swims.

Ideally individual addressing would be a feature of the system design and not require integrated control electronics. Selectivity in wireless systems can be achieved if the system is designed to operate at resonance with different actuators being sufficiently separated in the frequency domain to be individually actuated by frequency-dependent power.

Rectification of oscillatory motion due to resonance is key to the operation of resonant actuators. Documented methods include impact, and ratchet-like behavior to convert oscillating motion to linear displacement or rotation in microsystems.

Although several sub-millimeter size microrobots have been proposed, none of these efforts have resulted in devices capable of performing useful tasks. Major deficiencies in these microrobots are propulsion and actuation. Few practical actuators exist that can generate sufficient force to perform tasks at these scales.

SUMMARY OF THE INVENTION

It is thus an object of the invention to provide a wireless actuator that overcomes the deficiencies of the prior art. In addition, a propulsion system and a method for actuating an untethered microrobot that achieve an effective propulsion and actuation of such microrobots shall be provided.

As energy storage does not scale well with volume, and must be considered a primary design criterion, it is a further object of the invention to provide a method for supplying energy to an actuator that allows for miniaturization of the actuator.

Furthermore, force output shall be optimized, and selective control of individual actuators shall be possible.

These and other objectives are achieved by a microrobot as claimed in claim 1, a micro actuation system according to claim 9, and a method for actuating an untethered microrobot with the features of claim 12.

The invention concerns the design and fabrication of sub-millimeter-sized microactuators that can function as actuators and preferably propulsion mechanisms for untethered microrobots. A new type of microactuator based on a resonant magnetic technique is presented.

The untethered actuator according to the invention comprises at least two magnetic bodies, acting as magnetic attractors, resiliently connected to one another and thus forming a spring-mass-system. The in particular soft magnetic bodies are magnetized in an external magnetic field such that attractive or repulsive magnetic forces are created between the bodies. The bodies resume their original position because of the spring forces when the magnetic field is switched off. The spring-mass-system is capable of being oscillated, in particular driven to resonance, by a pulsating, in particular an oscillating external magnetic field. The actuator further comprises a converter for converting the oscillatory motion of the at least two magnetic bodies such that it is utilizable.

The invention is based on an arrangement of a magneto-mechanical spring-mass system operating at resonance. Resonant actuators take advantage of the ability of the system to absorb large amounts of energy from a driving signal when the signal closely matches the natural resonance frequency of the system. The excitation of the actuator depends on magnetic forces between ferromagnetic bodies in a magnetic field. The invention capitalizes on the concept of rectified resonant oscillations of a spring-mass system which is wirelessly powered by external magnetic fields.

The forces generated between magnetic bodies in a magnetic field can be captured by an appropriate mechanical system to create wireless actuators. By shrinking the size of the magnetic bodies this method of actuation can be scaled to work in the micro domain. The actuator according to the invention relies on the interactions between two or more bodies of a soft magnetic material in a magnetic field. The forces combined with a resilient member connecting the bodies, e.g. microfabricated springs, and energy harvesting or rectification of the motion are used to make a wireless resonant magnetic microactuator. A microrobot is formed by combining the actuator with another microdevice that uses the energy/motion delivered by the actuator to perform a task, e.g. to propel itself. The actuator may be an integral part of the microdevice, for example, parts of the actuator may be used as sliding surface or may carry rectification fingers.

The invention is based on the fact that the two or more bodies become magnetized in an external magnetic field. The interactive forces between the small magnetic bodies in a—for example—spatially uniform magnetic field are used to drive the mechanism to resonance if the magnetic field is oscillated, e.g. switched on and off. This energy is then used to move a robot through its environment or to fulfill other tasks. Preferably, a converter is present for converting the oscillatory motion of the magnetic bodies such that it can be used for actuating a propulsion mechanism or for actuating other microdevices, such as a micropump, a micromotor, a microlinear actuator, a micropositioner, a microneedle a mechanical state machine, or the like. When combined with a method of producing asymmetric or finely tuned but balanced friction the actuator can be used as a propulsion mechanism to drive a microrobot across a substrate in a controlled manner. The robot can also be driven across normal surfaces when driving parameters are matched to surface characteristics.

To harvest the energy stored in the mechanical oscillation of the bodies, the bodies are designed and arranged in such a way that momentum and/or impact is transferred between the magnetic bodies or to an additional element when oscillated. Such an additional element may be an active area of a microdevice as mentioned above. Preferably rectification of the motion of the magnetic bodies is performed. In a preferred embodiment of the invention, the actuator itself comprises a rectifier that is capable of rectifying the oscillatory motion, for example such that a net movement in a predetermined direction is achieved. Such a rectifier may comprise, for example, movable elements like a ratchet, a finger or another surface structure such that an asymmetric coefficient of friction of the outer surface, e.g. a sliding surface, of the robot is achieved which results in a stick-slip-motion (linear or rotary). In addition or as an alternative, a substrate for the robot may be provided with an asymmetric coefficient of friction to achieve such a stick-slip motion.

Preferably, a difference between the static and dynamic friction is utilized to achieve rectification, in particular a net movement or rotation in one direction. For example, the robot is designed such that inertial forces created by one of the bodies overcome the static friction when moving the desired direction while remaining below the level of static friction when moving in the other direction, e.g. by a specific shape and arrangement of the two or more bodies or simply by the equations of motion and their interaction with the frictional forces.

The small sub-millimeter sized robots with an actuator according to the invention are, for example, capable of being driven forward and turning in place on a specially prepared substrate but also drive and turn on any flat clean surface, e.g. glass or silicon wafer.

The magnetic bodies preferably comprise a soft magnetic material, in particular nickel, iron, permalloy, supermalloy, mu-metal or another alloy suitable for being magnetized in an external field. Soft magnetic materials are characterized by their high permeability and low coercivity ($H_{ci}<10^3$ A/m) such that they can be easily magnetized and demagnetized by external fields. The external field is preferably but not necessarily homogenous. The resilient connection between the bodies is at least in parts non-magnetizable such that the bodies are magnetically insulated from one another, no closed magnetic circuit is formed and magnetic forces between the bodies are created.

Due to shape anisotropy a magnetic torque is generated in the uniform magnetic field that results in a rotation of the actuator such that the axis of the bodies is naturally aligned with the direction of the field. This is especially useful when the actuator is used as a propulsion mechanism for a microrobot. By varying the direction of the magnetic field it is thus possible to align and move the micro-robot in different directions. To generate sufficient torque, it is preferred that the envelope of the bodies has an elongated shape.

In a preferred embodiment of the invention the actuator comprises a frame supporting a first one of the magnetic bodies, wherein a second one of the magnetic bodies is connected to the frame by means of a resilient member, in particular a spring. The frame may constitute a sliding surface for sliding on planar surfaces. The actuator can be manufactured by means of microfabrication.

For example, of the two magnetic bodies, in particular rectangular nickel bodies, is connected to a gold frame that rests on the substrate below. Attached to the frame, but elevated above the substrate, is a meander spring that supports the second nickel body. In a uniform magnetic field, the robot rotates to align the long axis of the combined nickel bodies with the field due to magnetic torque from shape anisotropy. The field also creates a magnetic force between the two bodies, causing the spring to deflect and the gap between the bodies to change. When the field is turned off, the magnetic forces vanish and the spring returns the bodies to their equilibrium position. A low-amplitude oscillating magnetic field operating at the appropriate frequency drives the actuator system to resonance. A driving field with sufficiently large amplitude induces stronger forces and impact occurs between the two nickel bodies. During impact, the spring mounted body transfers its momentum to the first body and reverses its motion to begin the oscillatory cycle again. Under the correct operating conditions this momentum transfer is enough to overcome static friction and cause the robot to slide a small distance with each impact.

The magnetic field strength required for this drive system has been demonstrated to be as low as 2 mT. This is only approximately 50 times stronger than the Earth's magnetic field and demonstrates the efficiency and potential scalability of this technology. To simplify control, the robot can be operated on an engineered substrate with interdigitated insulated electrodes. A phase-locked electrostatic potential clamps the robot to the substrate during specific parts of the oscillatory cycle, giving the user greater control of frictional forces and allowing the robot to move both forward and backward when using the appropriate correct phase offsets.

The dimensions of the actuator are typically less than 1 mm×1 mm×1 mm (length×width×depth), in particular as small as or less than 0.3 mm×0.3 mm×0.07 mm.

A system for actuating a microdevice, in particular a microrobot, according to the invention comprises an actuator as described above and a controllable magnetic field generator, wherein the magnetic field generator is designed to generate an oscillating magnetic field with an adjustable frequency.

For propulsion of a microrobot, also the direction of the field is adjustable. The magnetic field generator preferably comprises at least two pairs of electromagnetic coils that are preferably orthogonal with respect to one another. By selectively controlling the current in the orthogonal pairs a magnetic field with controllable direction can be generated, and the microrobot can be moved in this direction. Three pairs of orthogonal coils can be used for full three dimensional control.

The system preferably further comprises an imaging unit for acquiring an image of the microrobot, and a control unit for evaluating the image to derive an actual position of the microrobot and for controlling the magnetic field generator in dependence of the actual and nominal positions of the microrobot. The direction and strength of the magnetic field can be adjusted by the control unit such that a movement towards the nominal position is generated.

Furthermore, the resonance frequencies of more than one microrobot/actuator present in the system are preferably different from one another. This enables selective control of each individual microrobot by choosing an appropriate frequency of oscillation of the magnetic field.

The method for actuating an untethered microrobot according to the invention comprises the following steps:
  providing an untethered actuator comprising at least two magnetic bodies resiliently connected to one another, in particular as described above;
  applying a pulsating, in particular oscillating magnetic field to the actuator such that magnetic forces are created between the at least two magnetic bodies;
  driving the magnetic bodies to mechanical resonance;
  utilizing energy contained in the oscillatory motion of the magnetic bodies for creating useful motion, microrobot, in particular for propulsion of a microrobot or actuation of another microdevice.

Preferably, the oscillatory motion of the magnetic bodies is rectified such that a net movement is generated. This can be achieved by providing a microrobot and/or a substrate having an asymmetric friction coefficient, for example.

As the micro-robot aligns with and normally also moves in the direction of the magnetic field, the oscillating magnetic field is preferably applied in a direction corresponding to the direction of intended movement of the microrobot. A direction change can be realized by changing the direction of the magnetic field.

To control the motion of the microrobot, preferably an image of the microrobot in its environment is acquired and evaluated to derive an actual position of the microrobot. This actual position is compared with a nominal position of the microrobot, e.g. a target position. Then the magnetic field, in particular its direction, is controlled in dependence of the actual and nominal positions of the microrobot.

In a further preferred embodiment of the method according to the invention at least two actuators with different resonance frequencies are provided. They are selectively actuated by applying a magnetic field oscillating with a frequency adapted to the resonance frequency of a selected microrobot. Also, by designing actuators that rely on frequency components of the controlling field, several actuators can be operated independently on the same robot.

Motivation, design, fabrication, and experimental results of devices based on this principle are discussed in the following with reference to the drawings.

BRIEF DESCRIPTION OF THE DRAWINGS

FIGS. 1a+b shows the actuator according to the invention;

FIG. 2 shows an actuator providing energy/motion to a further microdevice;

FIG. 3a-c shows different embodiments of an actuator used as propulsion mechanism or for actuation of another microdevice;

FIGS. 14a+b shows an alternate design of an actuator according to the invention

FIG. 15 shows actuation of a microrotor by means of an actuator according to the invention.

DESCRIPTION OF THE PREFERRED EMBODIMENTS

Figure 4:
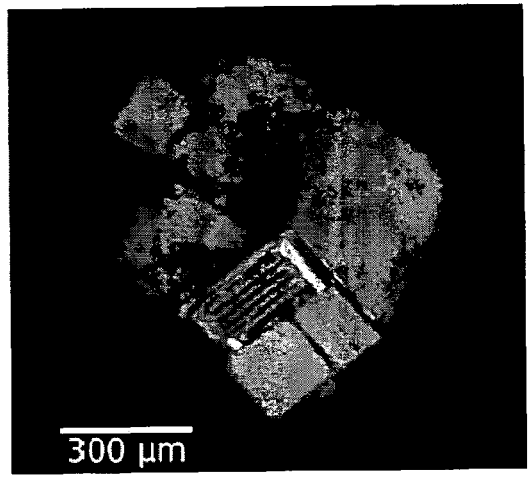
FIG. 4 shows a photograph a first embodiment of a microrobot according to the invention on a grain of table salt.

FIG. 1 shows the principle behind the actuator 10 with the magnetic forces and restoring spring force. In the presence of a magnetic field, two soft magnetic bodies 2, 3 are magnetized and attract each other (FIG. 1a). When the field is turned off, the magnetization returns to zero and the spring force pushes the bodies 2, 3 apart (FIG. 1b). By separating two soft magnetic bodies 2, 3 with a spring 5, a wireless resonant magnetic microactuator (WRMMA) is formed that is controlled with a pulsating magnetic field.

The spring directly or indirectly connects the bodies with one another. For example, as shown in FIG. 3a, both bodies 2, 3 can be connected to a common substrate 8, e.g. a common frame 1 (see FIG. 5a-c), by means of springs, or one body can be rigidly and the other one resiliently connected to the common substrate 8 (FIG. 3b). Instead of a spring, any other resilient member can be used. In addition or as an alternative, the magnetic bodies can be resilient themselves.

When actuated, large amounts of energy are absorbed by the system when it is driven at resonance, even when excitation is done with comparatively small amplitudes. This energy can be captured by an appropriately chosen conversion method, for example rectification to create useful mechanical motion. This is schematically shown in FIG. 2, where the actuator 10 comprises a converter 9 that delivers energy or motion to a further microdevice 11, e.g. a propulsion mechanism, a slider, a pump and the like. For example, the rectified motion could be used to drive a microslider back and forth for fine positioning or assembly.

A propulsion mechanism is not necessarily a separate element but may be inherent in the structure of the actuator. As shown in FIGS. 3a+b, the lower surface of the substrate 8 is structured such that an asymmetric friction coefficient is generated that enables rectification. The device thus moves in the direction of the lower arrow when oscillated.

FIG. 3c shows an example of a stationary actuator that actuates a further microdevice 11, e.g. a micropump, by transferring impact to an active area 12 thereof.

FIG. 4 shows a photograph of a wireless resonant magnetic microrobot with an actuator according to a first embodiment of the invention. It is a small microfabricated device that measures 300 μm wide and long and 70 μm high. It is powered by an oscillating external magnetic field that drives a large nickel body to resonance at the end of a gold spring. When combined with a method of producing asymmetric or finely tuned but balanced friction the robot can be driven across a substrate in a controlled manner.

Figure 5A:
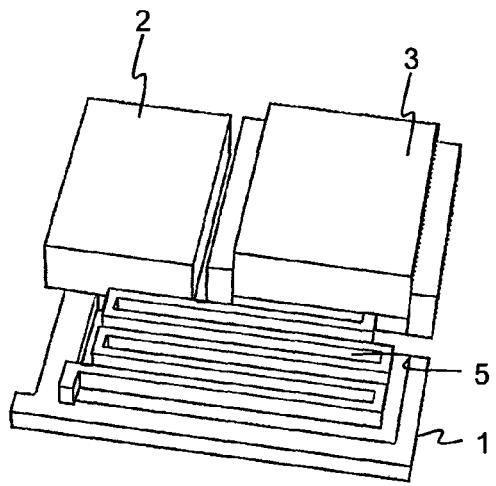
FIG. 5a-c show two 3D views and an exploded of a microrobot according a first embodiment of the invention.
Figure 5B:
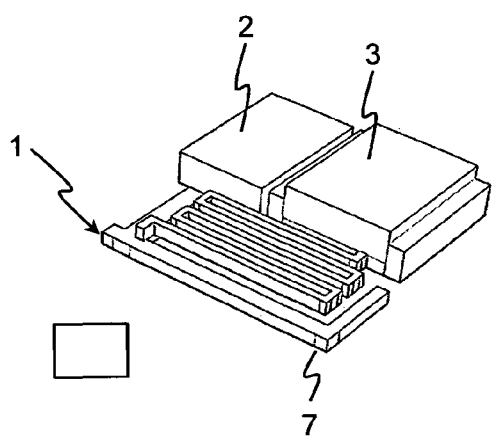
Figure 5C:
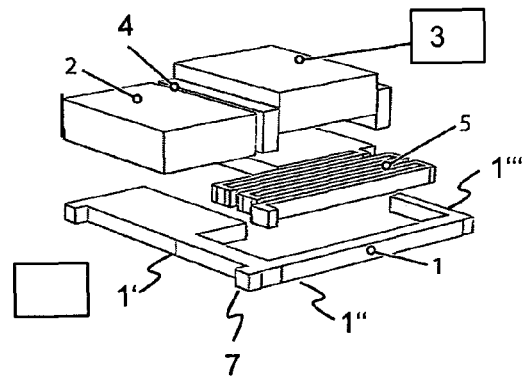

FIG. 5a-c shows a first embodiment of a microrobot according to the invention. FIGS. 5a+b show a 3D view of a FEM/CAD model of the microrobot. FIG. 5c shows an exploded view thereof: A base frame 1 made of gold comprises three elongated side parts 1', 1'', 1''' arranged like a U. The frame rests on dimple feet 7 such that the contact area with the substrate is minimized. A first body 2 made of nickel and acting as attractor is attached to the base frame 1 (side part 1'). A second body 3 also made of nickel and acting as swinging mass is arranged next to the first body 2 with a small gap 4 of 10-20 μm in between. The second body is held by a resilient member 5, here a meander gold spring, which in turn is attached to the base frame 1 about 6 μm above ground.

FIG. 6a-i show steps of the robot fabrication. The microrobot is surface micromachined using standard microfabrication processes including dry etching, photolithography, physical vapor deposition, electroplating and wet etching.

Figure 6:
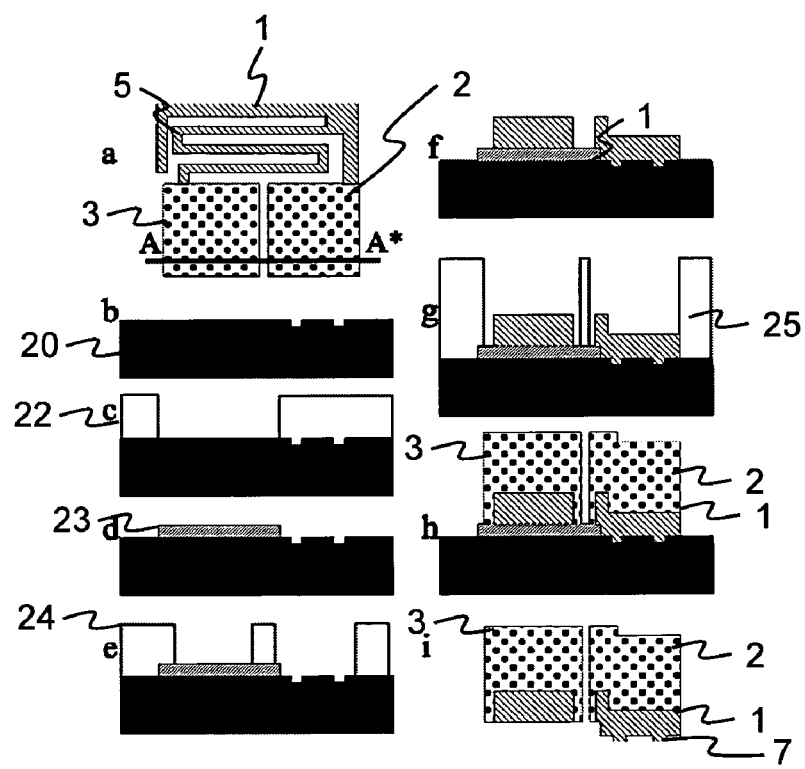
FIG. 6a-i show steps of a fabrication procedure for microrobots according to the first embodiment.

The first design (FIG. 5a-c) is fabricated with a surface micromachining process with thick photoresists and electroplating. FIG. 6a-i briefly illustrates the process. FIG. 6a shows a top down view of the microrobot with the frame 1 and spring 5 and the nickel bodies 2, 3. The line A-A* represents the cross-section for the rest of the illustrations. The first step (FIG. 6b) is the creation of dimple holes 21 of about 1 μm depth in a wafer 20. The dimples 7 will lift the body of the robot off the substrate and reduce stiction. Furthermore, alignment marks are etched. After etching the dimple holes 21 the wafer 20 is cleaned and coated with a Ti/Cu seed layer before spinning, patterning and develop photoresist 22 to form copper islands 23 that elevate the swinging part of the robot as shown in FIG. 6c. After copper electroplating (FIG. 6d) the resist 22 is stripped and photoresist 24 defining the gold springs and frame is applied (FIG. 6e). After gold plating (FIG. 6f) the nickel defining resist is applied (FIG. 6g) and the nickel bodies are plated (FIG. 6h). The device is released by immersing it into a solution with a selective copper etch (FIG. 6i).

1) Etch dimples and alignment marks in wafer surface.
 a) Clean new wafer.
 b) Spin, pattern and develop photoresist (PR).
 c) Etch 1 μm deep dimples.
 d) Strip PR and clean wafer.
2) Metal Deposition.
 a) Deposit Titanium adhesion layer 25 nm.
 b) Deposit Copper seed layer 500 nm.
3) Copper Plating.
 a) Spin, pattern and develop thick PR 10 μm.
 b) Electroplate 5 μm copper for sacrificial layer.
 c) Strip PR and clean wafer.
4) Gold Plating.
 a) Deposit Titanium adhesion layer 25 nm.
 b) Spin, pattern and develop thick photoresist 40 μm.
 c) Electroplate 20 μm of gold.
 d) Strip PR and clean wafer.
5) Nickel Plating.
 a) Spin, Pattern and Develop thick PR 90 μm.
 b) Electroplate 50 μm of Nickel.
 c) Strip PR and clean wafer.
6) Device Release.
 a) Dice wafer to separate families of devices.
 b) Immerse chip of devices in Ammonium persulfate.
 c) Remove and rinse devices after release.

Although gold is soft and ductile it was chosen for the spring material due to the ease of fabrication, the availability of a compatible Cu selective etch, the uniformity of its coverage and most importantly its non-magnetic properties. If a magnetic material is used as a spring to connect the two magnetic bodies, it can form a magnetic circuit that robs the gap between the two bodies of magnetic field strength and force. Nickel was chosen for the magnetic bodies due to its ease of deposition. Implementing a material with higher susceptibility will produce increases in interbody forces, but shape anisotropy also plays an important role in limiting the field strength.

Figures 7A, 7B:
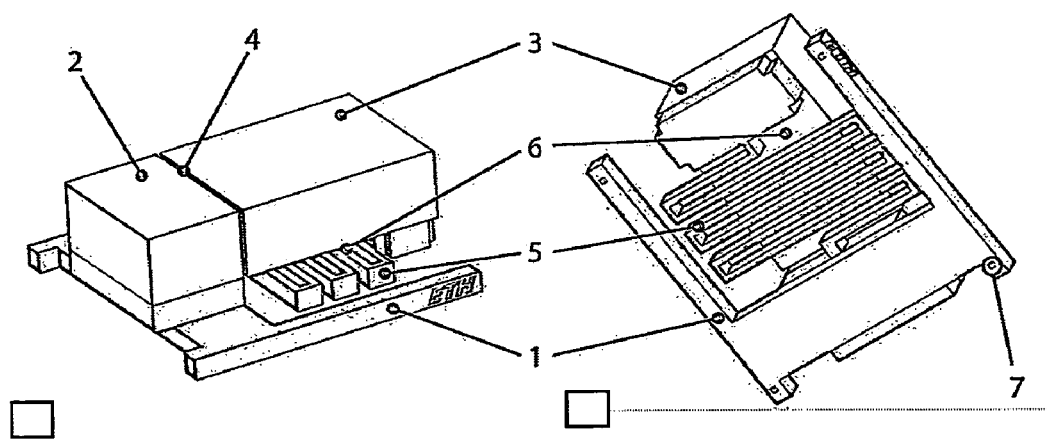
FIGS. 7a+b show a second embodiment of a microrobot according to the invention.

FIGS. 7a+b show a second embodiment of a microrobot according to the invention. The fabrication process is expanded with an additional sacrificial layer. FIG. 7a is a top/side view, FIG. 7b is a bottom/side view. The gold base frame 1 rests on dimple feet 7 (e.g. 5 μm×5 μm×0.75–2.0 μm). The nickel attractor 2 is attached to the base frame 1. The nickel swinging mass 3 is separated from the attractor 2 by a 10-20 μm gap 4 and suspended above ground by a meander gold spring 5 which in turn is attached to the base frame 1 about 6 μm above ground. An air gap 6 between compression spring 5 and nickel hammer 3 allows for larger springs and masses in a smaller area.

The second fabrication process allows for complex designs featuring multi-layered overhanging structures with a gap 6 in between the spring 5 and the swinging body 3.

The space gain makes symmetric arrangements of mass and spring possible leading to significant improvements in robot performance.

Actuation Principle

A. Magnetic Forces

The primary vectors that define the magnetostatic field in magnetized matter are (external) magnetic field strength, H (A/m), magnetization of the matter M (A/m), and magnetic flux density B (T) (bold symbols indicate vectors). The relationship between these vectors is $$B = \mu_0(H+M) \qquad (1)$$

where $\mu_0$ is the magnetic permeability of free space defined as $4\pi \times 10^{-7}$ Tm/A. For the idealized case of linear, isotropic, and homogeneous media the following relationships simplify (1) as $$M = \chi H \qquad (2)$$

$$B = \mu_0(1+\chi)H = \mu_0 \mu_r H \qquad (3)$$

where $\mu_0$ and $\mu_r$ are the susceptibility and relative permeability of the media, respectively. In general, these values are not constant but change with magnetization, approaching zero as the magnetization reaches a material dependent limit called the saturation magnetization, $M_s$. Within the saturation limits, the permeability can be thought as an amplification factor that creates a net magnetic field inside the matter through an external field. Ferromagnetic materials exhibit the largest relative permeability (in the order of $10^3$-$10^5$).

Figure 8:
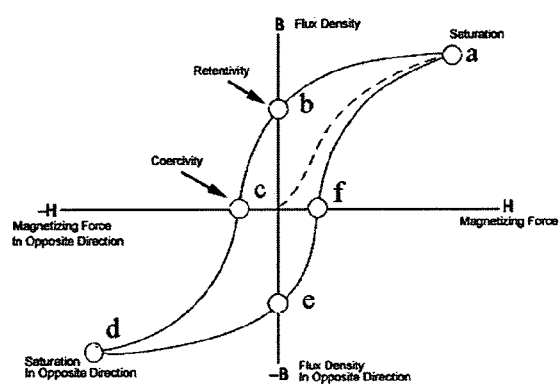
FIG. 8 shows the magnetic flux density in dependence of the magnetic field strength (B-H loop, hysteresis)

The dependence of magnetization on external fields (i.e. the B-H curve) for a magnetic material is shown in FIG. 8.

The nonlinear response of the material also changes with its previous state of magnetization (indicating hysteresis). A ferromagnetic material magnetized to saturation will keep part of its magnetization ($M_r$, remanent magnetization or retentivity) after the magnetizing field is taken away. It is necessary to apply a field $H_{ci}$ (coercivity) in the opposite direction of magnetization to cancel this magnetization. Soft magnetic materials (e.g., iron) are characterized by their high permeability and low coercivity ($H_{ci} < 10^3$ A/m) such that they can be easily magnetized and demagnetized by external fields. Hard magnetic materials (e.g. permanent magnets), on the other hand, have lower permeability but high coercivity ($H_{ci} > 10^4$ A/m) and remanent magnetization, therefore, once magnetized, they retain their magnetization against external fields. The magnetic force and torque that are exerted on an object with uniform magnetization M in a magnetic field with flux density B are defined as $$F_m = V_m(M \cdot \nabla)B \quad (4)$$

$$\tau_m = V_m \cdot M \times B \quad (5)$$

where $V_m$ is the volume of the magnetized object. Notice that the magnetic torque is dependent on the elements of B whereas the magnetic force is dependent on the gradient of B. In the case of hard magnetic materials with fixed M, (5) can be applied directly. Soft magnetic materials require an energy balance analysis matching the shape anisotropy with the applied torque and magnetization. Geometries with large length to width ratios have very strong shape anisotropy and M can be assumed to be within a few degrees of the preferred axis of magnetization (easy axis). Equations (4) and (5) indicate that magnetic forces are volumetric. Therefore, the required fields and field gradients to exert a certain torque and force on a magnetized object increase rapidly as the object gets smaller. Equations (4) and (5) also show that a magnet in a uniform field will feel no translational forces, only torques attempting to align it with the field. This seems counterintuitive because we rarely deal with uniform fields except in specially constructed situations such as the bore of an MRI, the core of a long solenoid or the center of a Helmholtz coil pair. The analysis of magnetic forces between individual magnets is in reality just an extension of the above equations where B results from the presence of a second magnet. This can be more easily understood if magnets are thought of as a collection of two poles N and S with strength p as they were when magnetic forces were first being investigated in the late 1700's The force between two poles $p_1$ and $p_2$ separated by a distance d is given by equation (6):

$$F = p_1 p_2 / d^2 \quad (6)$$

where pole strength and field are related by $$H = p/d^2 \quad (7)$$

The magnetization of a magnet is related to its pole strength by $$M = p/A \quad (8)$$

where A is the cross sectional area of the magnet. In reality a magnet consists of two poles and interactions between them must also be considered, but this explanation was included because it helps explain magnet interactions. If the opposite poles of two magnets are brought into contact with a contact area of A cm² with induction in the magnet B in gauss, then the force is given in dynes in Equation (9)

$$F = AB^2/8\pi \quad (9)$$

This only works when the two magnets are in contact. Force falls rapidly when the magnets are separated as indicated in equation (6). The force also depends on the shape, interface quality and magnet properties of the two magnets. As stated before, if a piece of soft magnetic material is placed in a uniform field it feels no translational force. If two pieces of material are placed parallel and adjacent to each other in a uniform magnetic field which is parallel to the long axis of the pieces, they will both become magnetized with similar poles adjacent to each other. The fields from these poles will interact and create a mutual repulsion based on separation distance and magnetization as indicated in equation (6). If the two pieces are aligned end-to-end then the opposite poles at the end of the magnets will attract each other.

Figure 9:
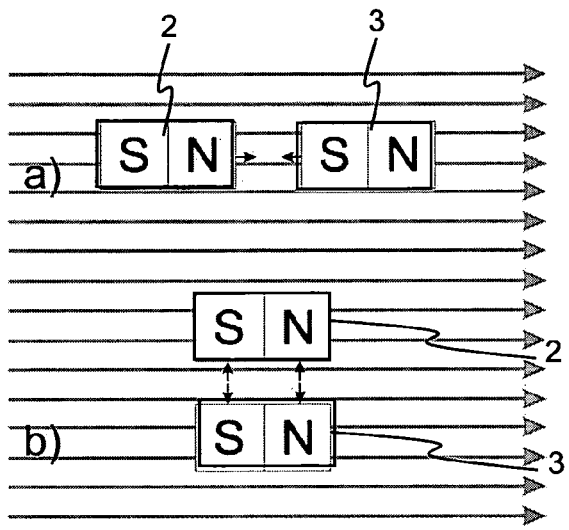
FIGS. 9a+b show an illustration of the interaction of two magnetic bodies in a uniform field.

This is demonstrated in FIGS. 9a+b. FIG. 9a shows attractive and FIG. 9b repulsive forces generated between soft-magnetic bodies in a uniform magnetic field. These forces are harnessed to convert magnetic energy directly to mechanical energy in the wireless resonant magnetic microactuator Analysis of magnetic system usually does not allow for analytical solutions. Finite element modeling is typically used to find the forces and fields.

B. Propulsion

The actuator relies on the interactions between soft magnetic materials in a uniform field. The forces combined with microfabricated springs and energy harvesting to rectify the motion are used to make a wireless resonant magnetic microrobot.

As shown in FIG. 5a-c, the magnetic microrobot consists of two rectangular nickel bodies 2, 3. One is connected to a gold frame 1 that rests on the substrate below, suspended on small stiction reducing dimples. Attached to the frame, but elevated 5 µm above the level of the substrate is a meander spring that supports the second nickel body which is also elevated above the substrate. When placed in a uniform magnetic field, the robot aligns the combined long axis of the nickel bodies with the field due to shape anisotropies.

The magnetic field also creates an attractive force between the two bodies, causing the spring to deflect and the gap between them to narrow. When the field is turned off, the attractive forces decrease to the level of those generated by the magnetic remanence of the nickel which is significantly lower. When excited with a low amplitude oscillating magnetic field the system can be driven to resonate at its resonant frequency which is dependent on the spring constant and weight of the oscillating mass. When the amplitude of the driving field is increased the amplitude of the oscillations increase until impact occurs between the two bodies. Under the correct operating conditions during this impact the second body transfers its momentum to the first body and reverses its motion to begin the oscillatory cycle again.

Figure 10A:
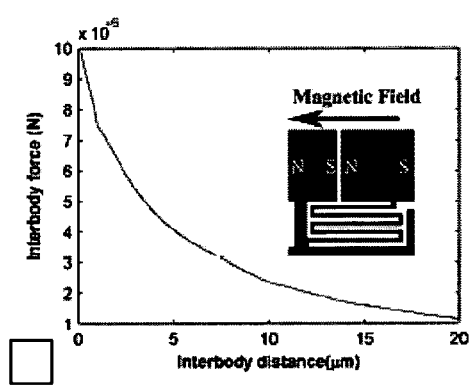
FIG. 10a shows the inter-body forces between as a function of the inter-body distance.
Figure 10B:
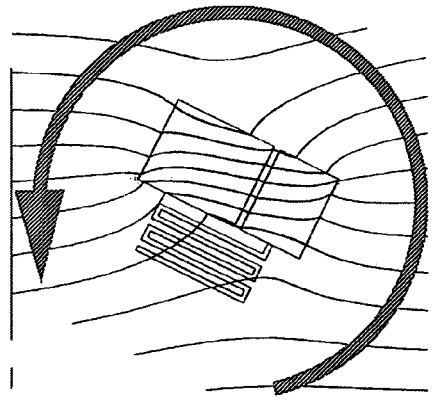
FIG. 10b shows an illustration of FEM-derived inter-body forces and torque of two close-by soft-magnetic bodies in an external field.

The interbody forces as a function of their distance as well as the streamlines of the magnetic field leading to the alignment along the direction of the field are shown in FIGS. 10a+b. FIG. 10a shows the forces between two 150 µm×130 µm×50 µm (W×L×H) nickel bodies with a 5 mT field applied along the principle axis, derived by finite elements modeling (FEM). The inset shows the robot body with magnetic poles induced by the external field that generate the modeled forces. The combined shape of the bodies acts like a compass needle in an applied external magnetic field and allows control of the orientation of the robot. FIG. 10b shows an illustration of FEM-derived inter-body forces and torque of two close-by soft-magnetic bodies in an externally applied field of a 30° angle relative to the principal axis of the combined nickel bodies.

Figure 11:
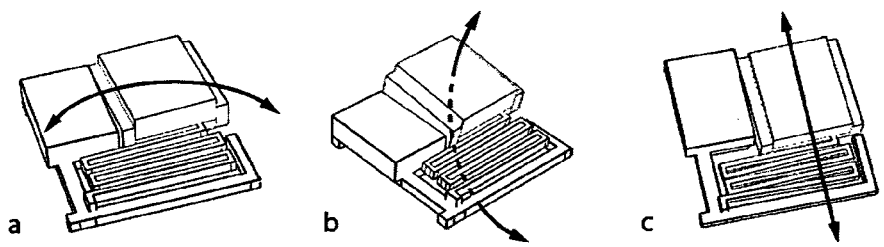
FIG. 11a-c shows three different oscillation modes of the robot.

Three of the different oscillation modes of the designed robot are schematically shown in FIG. 11a-c. FIG. 11a illustrates the rotation mode (rotation of the swinging mass 3 about an axis perpendicular to the plane of the frame 1); FIG. 11b shows up-/down motion of the swinging mass 3 in a direction perpendicular to the plane of the frame 1; FIG. 11c shows spring compression, i.e. movement parallel to the plane of the frame 1. The rotation mode (FIG. 11a) is the desired one for planar movement of the microrobot. The other modes may be beneficial in connection with other designs.

If the device was actuated on a frictionless surface it would simply vibrate in place without exhibiting any controllable motion. However it is located on a substrate and under the proper adjustment of static and dynamic friction in the correct phase of the oscillatory motion the device can be made to move in either forward or backward directions in a controllable manner. In an ideal system such friction would be well characterized and designed into the device. In this system we have enlisted the aid of electrostatic clamping through the use of electrodes in the substrate and charge separation. By applying a magnetic field with a square wave signal at a desired frequency and applying a clamping voltage with a phase offset, the frictional forces are increased when the oscillatory body begins to travel forward and released before impact (FIG. 12).

Figure 12:
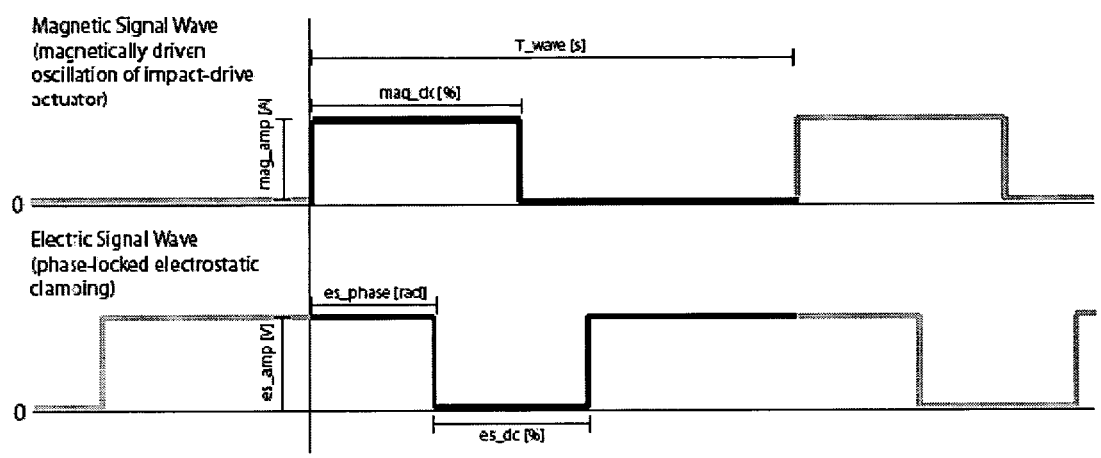
FIG. 12 shows examples of magnetic field and electrostatic clamping waveforms.

FIG. 12 shows magnetic field and electrostatic clamping waveforms for velocity control (up and down time of electrostatic clamping). The magnetic signal wave influences the magnetically driven oscillation of the impact-drive actuator, the electric signal wave controls the phase-locked electrostatic clamping. This allows the device to slide forward before clamping again when the next cycle starts. The ability to control the clamping waveform also allows for a convenient velocity control mechanism.

Figure 13:
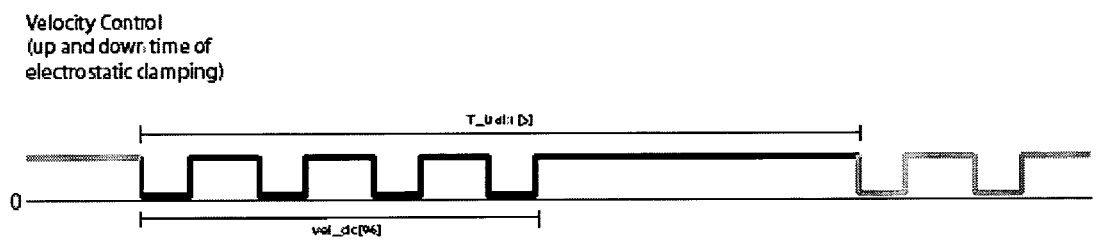
FIG. 13 shows an example of a velocity control waveform.

As shown in FIG. 13 (velocity control waveform), the effective velocity of the microrobot can be controlled by releasing the clamping for differing duty cycles similar to a pulse-width modulation controller.

Modeling and Design

Accurate analysis of the magnetic forces and torques on a magnetic body in a magnetic field are most easily calculated with analysis software. But even the best analysis can differ significantly from model results due to changes in material properties and geometry. Model results should always be compared to experimental results in situations where force levels are critical to the operation of the device. It is best to design the operation of the devices so force levels can vary widely with minimal influence on device operation.

A. Interbody Magnetic Force Modeling

The forces between the two pieces of magnetic material depend on many factors. In general as the distance between the samples decreases, the force increases quickly to the limit given by Equation (9). The behavior of the force-distance plot depends on material properties, sample shape, interface area and applied magnetic field (H). Early experiments on the magnetic forces between nickel bodies have shown that while the measured and modeled forces are within an order of magnitude they differ in many ways. Most significantly the magnetic forces never reach the levels predicted by modeling.

Initial measurements were approximately a factor of 3 smaller than predicted. Much of this decrease was found to be the result of sidewall angles on the magnetic bodies, but even flipping the second body during force measurement tests to negate the angle, measurement were seldom as large as expected. Small surface imperfections and irregularities preventing close mating of the surfaces are suspected to be part of the problem. It was also expected that magnetic doubling the size of one of the magnetic bodies would increase the force significantly, but this was found to play a minimal role behind the variations explained by surface irregularities.

Experiential data also doesn't show the strong increase at small gaps predicted by the modeling. This disagreement may come from a variety of sources. The range of dimensions in the model is near $10^5$ and can cause irregularities and problems in the model. In addition accurate modeling of the small gaps requires extremely small mesh size. Even with adaptive meshing capabilities this can make the modeling very time consuming. The results of the magnetic modeling indicate that accurate prediction of the magnetic forces is difficult and that until it is well understood, experimental data should be relied on and springs should be designed conservatively to allow for proper deflection. In the end the magnitude of the force between the bodies is of secondary concern and will not change the resonant frequency of the device.

B. FEM Coil Simulation and Design

Unlike the calculation of interbody forces, fields from electromagnetic coils can be calculated from basic principles. In simple geometries values can often be calculated from simple analytical equations. This being said, it is often easiest to simply design and model a coil with FEM software or in the very least setup a spread sheet or script to perform the calculations. In addition to modeling the magnetic fields from coils designers must also analyze the electrical properties of the coil. The designer must balance the magnetic, inductive, resistive, voltage and current requirements of the coil. For a give multi-layer coil with outer diameter a, inner diameter b, length l and n turns the inductance L can be calculated using (10)

$$L=n^2 0.2a^2/(3a+9l+10(a-b)) \quad (10)$$

which holds for single isolated coils. Putting two coils in close proximity on the same circuit will cause mutual induction between them that increases the circuit induction to somewhere between that of a single coil and that of the two coils being situated side by side.

EXPERIMENTAL RESULTS

A. Setup

The setups for driving the robots consist of a substrate ("playing field") capable of electrostatic clamping, a coil setup for generating the magnetic field, custom drive electronics, power supplies, a camera with a fixed focus zoom lens for vision feedback, a LED-ring for homogeneous illumination conditions, and a standard PC for running custom software developed at our lab for manual control and automated servoing. Furthermore, the setups are enclosed in an environmental box to reduce contamination and allow for humidity control with a dry air flow.

1) Coils: The current experimental setup contains two electromagnetic coils with variable intercoil spacing. The coils have a cross-section of $\approx 100$ mm$^2$ a thickness and width of 10 mm and an inner diameter of 30 mm with 70 turns of wire. Equation (10) shows the inductance to be on the order of 200 μH per coil, or 400 μH and 800 μH when placed side by side. Mutual inductance between the two coils depends on the separation gap between them. With a gap of approximately 30 mm (center to center) the inductance was measured to be near 600 μH The value is difficult to calculate and is best found from experiments or simulation. There are a number of ways to measure coil inductance. Most rely on the use of a function generator, a resistor of known resistance and comparing the voltages across the coil and resistor at different frequencies. When designing the coils it is important to minimize the inductance when increasing the driving frequency or field strength. Decreased inductance allows the strength of the field to change faster (dB/dt gets larger) with a given driving voltage. The actual shape of the magnetic field wave form was monitored with an Allegro A1302 Continuous time linear hall effect sensor. Comparison of the coil drive signal and the sensor output showed a direct correlation and reproduction of all the drive signal bumps and wiggles in the magnetic field. The experimental setup can also be two or three nested Helmholtz coil pairs with orthogonal orientations capable of creating an area of uniform field with any user defined orientation.

The field angle can be instantly set by superposition of the two or three orthogonal fields created by the coils.

2) Driving Surface: The robot was operated on a silicon chip with an embedded interdigitated electrode field fabricated on the surface electrodes used for electrostatic clamping. The field was fabricated on an oxidized silicon wafer with 200 nm of gold or aluminum which is patterned and etched to form the electrode layer. This was then covered in 1 μm of silicon oxide dioxide which is patterned to open bonding pads. Field walls, obstacles and patterns were fabricated with 10-50 μm thick SU8 photoresist. The fields were mounted and wire bonded in open face packages for use in specially designed PCBs with appropriate connectors for the electrostatic clamping signal. The active area of the arena with interdigitated electrodes was slightly less than 1 cm square. The arena is mounted inside the coils and covered with glass protected the robot from dust and allowed the operator to reposition the robot manually with magnets without fear of knocking it off the field.

3) Electronics: During the design of the device, considerable effort was involved in designing the device with a resonant frequency below 5 kH. Due to the high voltage and current requirements of the coils the field was driven with an H-bridge switching motor amplifier that relies on the inductance of the coils to smooth out the current ripples between voltage pulses. Investigation into linear amplifier driven systems showed that unacceptable heating would occur in the amplifier at low frequencies. The current amplifier was driven with custom drive electronics which allow for driving the system with arbitrary waveforms and enables synchronous operation of multiple coil pairs. The robot was visually tracked using a 60 Hz firewire camera and microscope lens. Robot tracking is done online for visual servoing applications.

B. Magnetic Forces

Magnetic forces in the microrobot have not been measured, although it has been observed that under high excitation field, the oscillating body will latch to the stationary body, preventing it from oscillating. It can be released by decreasing and reversing the direction of the magnetic field or by physically shaking the robot and substrate with a sharp impact.

C. Frequencies

A laser vibrometer was used to measure the frequency response of the mass-spring system. The results of the measurement were used to predict the best driving frequency of the microrobots. Vibrometer results were usually in reasonably close agreement to the simulations even though spring dimensions were seen to vary significantly from the design

D. Actuation and Driving

Several robots have been driven around the field. Optimization of the driving parameters has not yet been performed, but when devices have been found to operate they typically operate reliably at those conditions. When operated with a steady frequency at conditions that appear to the human eye to be optimal the robots move at velocities between 100 μm/s and 2000 μm/s, much to fast to be controlled manually. This has limited our optimization of actuation parameters, but recent control software improvements have allowed us to slow the robot and operate it in a velocity controlled manner. This was achieved by changing the electrostatic clamping signal to an always high signal with short bursts of pulses to release the device.

E. Electronics

During the design of the device, considerable effort was involved in designing the device with a resonant frequency below 5 kH. Wave forms for frequencies in this range can be generated with inexpensive computer based data acquisition cards (DAQ) and moderate voltages ($\approx$100 V). Due to the high voltage and current requirements of the coils the field was driven with an H-bridge switching motor amplifier that relies on the inductance of the coils to smooth out the current ripples between voltage pulses. Investigation into linear amplifier driven systems showed that unacceptable heating would occur in the amplifier at low frequencies. The motor amplifier was driven with custom drive electronics designed to receive a square wave driving signal of variable amplitude from a computer that ranges from zero to the desired amplitude. Preliminary electrostatics are driven directly from the DAQ card with a high voltage amplifier.

F. Camera and Vision Tracking

The robot was visually tracked using a 60 Hz firewire camera and microscope lens. Robot tracking was done offline in initial experiments, but had to be done real-time for the competition. Special attention has to be given to proper lighting methods.

OUTLOOK AND CONCLUSIONS

A novel magnetic actuation and propulsion mechanism suitable for use on untethered microrobots is introduced. This method has been evaluated by driving a microrobot on structured planar surfaces. This method shows potential for synchronously controlling multiple wireless agents or actuators at the sub-millimeter scale. The structured surface restriction for the device can be removed by designing structures on the device that allow for asymmetrical friction. The actuators are in general also able to operate in fluidic environments. The control of multiple devices with the same control/power signal as well as swarms of devices is possible by using different resonance frequencies.

FIGS. 14a+b show two alternate embodiments of the invention. Two magnetic bodies 2, 3 are separated by a spring 5. In both embodiments one of the bodies 2, 3 has angled protrusions (fingers) 13 on the sides. These protrusions 13 act as friction fingers against the walls of a narrow trench 14 in that the actuators are operated. The trench may or may not be wider or narrower than the width of the fingered body. If it is narrower, the fingers 13 are deflected slightly and the distance from the body to the finger tip is reduced.

By their design, the friction between the fingers 13 and the trench walls 14 is greater when pushing on the body in such a way that the friction applies a compressive force to the fingers and increases the angle between the bodies and the fingers while the friction is significantly lower when friction forces attempt to bend the fingers away from the wall and reduce distance from the finger tips to the body. When driven, these actuators will move in the direction of lowest friction. The actuator in FIG. 14a will move to the right when the inertial forces from the fingerless body 3 are transmitted through the spring to the fingered body 2. The actuator in FIG. 14b will move to the left when inertial forces from the fingerless body 3 are transmitted through the spring 5 to the fingered body 2. Additionally, the actuator in FIG. 14b will move to the left, if the amplitude of the oscillations of the fingerless body 3 is large enough to cause impact between the bodies 2, 3. In this situation, the momentum of the swinging body 3 will be transferred in the form of an impact force which is significantly larger than the magnetic forces used to excite the system to resonance.

FIG. 15 shows a further embodiment of the invention in which an actuator actuates a microdevice 11, here a mechanical rotor 30. The rotor 30 comprises a shaft 32 and a plurality of elastic fingers 34 projecting radially outward. The actuator 10 comprises two magnetic bodies 2, 3 and a resilient connection 5' between the magnetic bodies 2, 3, acting as spring 5. The connection 5' comprises, in a cross-section perpendicular to the axis of rotation of the rotor 30, two generally parallel beams 36, 37 connected by a further beam 38. At least one of the beams 36, 37, 38 is resilient, or there is a hinged connection that allows for variation of the distance between the two parallel beams 36, 37 when the magnetic bodies 2, 3 change their distance in a pulsating external magnetic field. The rotor 30 is arranged in between the beams 36, 37, 38 such that its protrusions contact the parallel beams 36, 37. By changing the distance between beams 36, 37, the fingers 34 are deformed and the rotor 30 rotates because of asymmetric friction between the beams and the fingers 34.

What is claimed is:

1. A wireless resonant micro-actuator for untethered micro-robots, the wireless resonant micro-actuator comprising:
    at least two magnetic bodies resiliently connected directly to one another by a resilient member to form a spring-mass system;
    a magnetic field generator configured to generate a pulsating or oscillating external magnetic field that creates a magnetic force to wirelessly power the spring-mass system, wherein the at least two magnetic bodies are capable of being mechanically oscillated to resonance with respect to one another; and
    a converter that converts the oscillatory motion of the at least two magnetic bodies to create useful motion for the untethered micro-robot.

2. The wireless resonant micro-actuator of claim 1 wherein the at least two magnetic bodies are configured to transfer momentum between the magnetic bodies or to an additional element when oscillated.

3. The wireless resonant micro-actuator of claim 1 wherein the converter comprises a rectifier that rectifies the oscillatory motion such that a net displacement is generated.

4. The wireless resonant micro-actuator of claim 1 comprising asymmetric friction acting on one of magnetic bodies in order to rectify the oscillatory motion.

5. The wireless resonant micro-actuator of claim 1 wherein the converter comprises at least one of a pump, a mechanical state machine, a linear actuator, a rotary actuator, a micropositioner, or a slide.

6. The wireless resonant micro-actuator of claim 1 wherein the at least two magnetic bodies comprise a soft magnetic material, selected from a group including nickel, iron, permalloy, supermalloy, mu-metal or other magnetic alloy, and the resilient member comprises a non-magnetizable material.

7. The wireless resonant micro-actuator of claim 1 comprising a frame supporting one of the magnetic bodies.

8. The wireless resonant micro-actuator of claim 1 wherein the magnetic bodies comprise an elongated shape configured to propel the micro-robot.

9. The wireless resonant micro-actuator of claim 1 wherein the external magnetic field is configured to generate a pulsating or oscillating magnetic field with an adjustable amplitude and/or frequency, such that the wireless resonant micro-actuator comprises a propulsion mechanism for the micro-robot.

10. The wireless resonant micro-actuator of claim 1 wherein the magnetic field generator comprises at least two pairs of electromagnetic coils that are generally orthogonal with respect to one another, wherein current through these two pairs of electromagnetic coils can be controlled independently in order to adjust a direction of the magnetic field.

11. The wireless resonant micro-actuator of claim 1 comprising:
    an imaging unit configured to acquire an image of the wireless resonant micro-actuator; and
    a control unit configured to evaluate the image to derive an actual position of the wireless resonant micro-actuator and to control the magnetic field generator to propel the wireless resonant micro-actuator from the actual position to a desired position.

12. A wireless resonant micro-actuator for untethered micro-robots comprising:
    an untethered micro-robot;
    a wireless resonant micro-actuator comprising:
        at least two magnetic bodies that are resiliently connected directly to one another by a resilient member to form a spring-mass system;
        a magnetic field generator configured to generate a pulsating or oscillating external magnetic field that creates a magnetic force to wirelessly power the spring-mass system, wherein the at least two magnetic bodies are capable of being mechanically oscillated to resonance with respect to one another; and
        a converter that converts the oscillatory motion of the at least two magnetic bodies to create useful motion for the untethered micro-robot.

13. A method for actuating a wireless resonant micro-actuator for untethered micro-robots, the method comprising the steps of:
    resiliently connecting at least two magnetic bodies directly to one another by a resilient member to form a spring-mass system;
    applying a pulsating or oscillating external magnetic field to create a magnetic force to wirelessly power the spring-mass system;
    driving the at least two magnetic bodies to mechanical resonance; and
    using energy contained in the oscillatory motion of the at least two magnetic bodies for creating useful motion for the untethered micro-robot.

14. The method of claim 13 comprising rectifying the oscillatory motion of the magnetic bodies such that a net movement or net rotation is generated.

15. The method of claim 13 comprising utilizing the energy contained in the oscillatory motion of the magnetic bodies to propel the micro-robot.

16. The method of claim 13 comprising applying the oscillating magnetic field in a direction corresponding to the direction of intended movement of the micro-robot.

17. The method of claim 13 comprising adjusting a direction of the magnetic field in order to obtain a change in a direction of movement of the micro-robot.

18. The method of claim 13 comprising applying asymmetrical friction to one of the magnetic bodies in order to rectify the oscillatory motion.

19. The method of claim 13 comprising the steps of:
acquiring an image of the wireless resonant micro-actuator;
evaluating an actual position of the wireless resonant micro-actuator from the image; and
controlling the magnetic field generator to propel the wireless resonant micro-actuator from the actual position to a desired position.

20. The method of claim 13 comprising:
providing at least two wireless resonant micro-actuator with different resonance frequencies; and
selectively exciting the wireless resonant micro-actuator by applying a magnetic field oscillating with a frequency adapted to the resonance frequency of a selected actuator.

* * * * *